United States Patent [19]

Pilz et al.

[11] 4,161,329

[45] Jul. 17, 1979

[54] TRACTOR TO TRAILER CONNECT SYSTEM

[75] Inventors: Gilbert B. Pilz, Milford, Mich.; George H. Young, Ottawa, Kans.

[73] Assignee: Gulf & Western Manufacturing Company, Southfield, Mich.

[21] Appl. No.: 875,570

[22] Filed: Feb. 6, 1978

[51] Int. Cl.² ............................................. B60D 7/02
[52] U.S. Cl. ................................. 280/474; 180/140; 280/432
[58] Field of Search ............... 280/437, 474, 460 R, 280/423 R, 432, 400, 91, 5 A, 5 C, 5 D, 5 E, 402, 404, 415 R, 415 B, 45; 180/24.01, 22, 53 R, 11, 12, 13, 14 R, 77 MC, 46, 140; 222/626, 627, 609, 610; 141/284

[56] References Cited

U.S. PATENT DOCUMENTS

| | | | |
|---|---|---|---|
| 1,951,147 | 3/1934 | Griest ........................................ 280/91 |
| 2,156,601 | 5/1939 | Mosling ..................................... 280/91 |
| 2,330,897 | 10/1943 | Kirksey .................................... 280/432 |
| 2,366,122 | 12/1944 | Merce ........................................ 74/493 |
| 2,783,849 | 3/1957 | Armington ............................... 180/140 |
| 3,185,245 | 5/1965 | Hoyt ........................................ 180/140 |
| 3,246,912 | 4/1966 | Cunha .................................... 280/407 |
| 3,446,307 | 5/1969 | Logus ...................................... 92/62 X |
| 3,454,123 | 7/1969 | Lewis ........................................ 180/23 |
| 3,503,463 | 3/1970 | Lestoque ................................. 180/140 |
| 3,586,119 | 6/1971 | Fullerton ................................... 280/80 |
| 3,724,585 | 4/1973 | Conrad .................................... 180/140 |
| 3,903,983 | 9/1975 | Yeske ...................................... 180/140 |

*Primary Examiner*—Robert R. Song
*Assistant Examiner*—R. Schrecengost
*Attorney, Agent, or Firm*—Meyer, Tilberry & Body

[57] ABSTRACT

A tow tractor having a pair of front steerable wheels and a pair of rear steerable wheels is provided with attachment means for selectively connecting it to a vehicular trailer either by an articulated draft connection to permit swiveling movement therebetween or by a rigid unitary connection for operating the tractor and trailer as a straight truck. Steering mechanism is provided on the tractor for selectively affording four-wheel simultaneous steering of both said front and rear pairs of wheels in the same direction, or conventional front wheel steering only of the front pair of wheels while maintaining the rear pair of wheels locked in normal straightahead running position.

17 Claims, 7 Drawing Figures

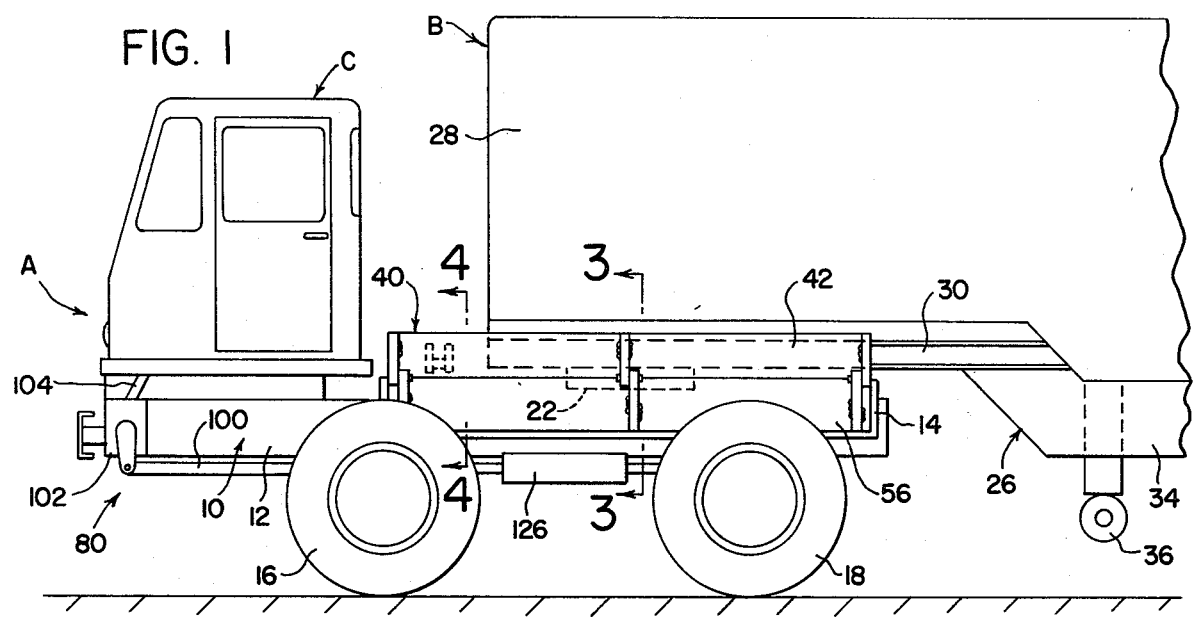
FIG. 1
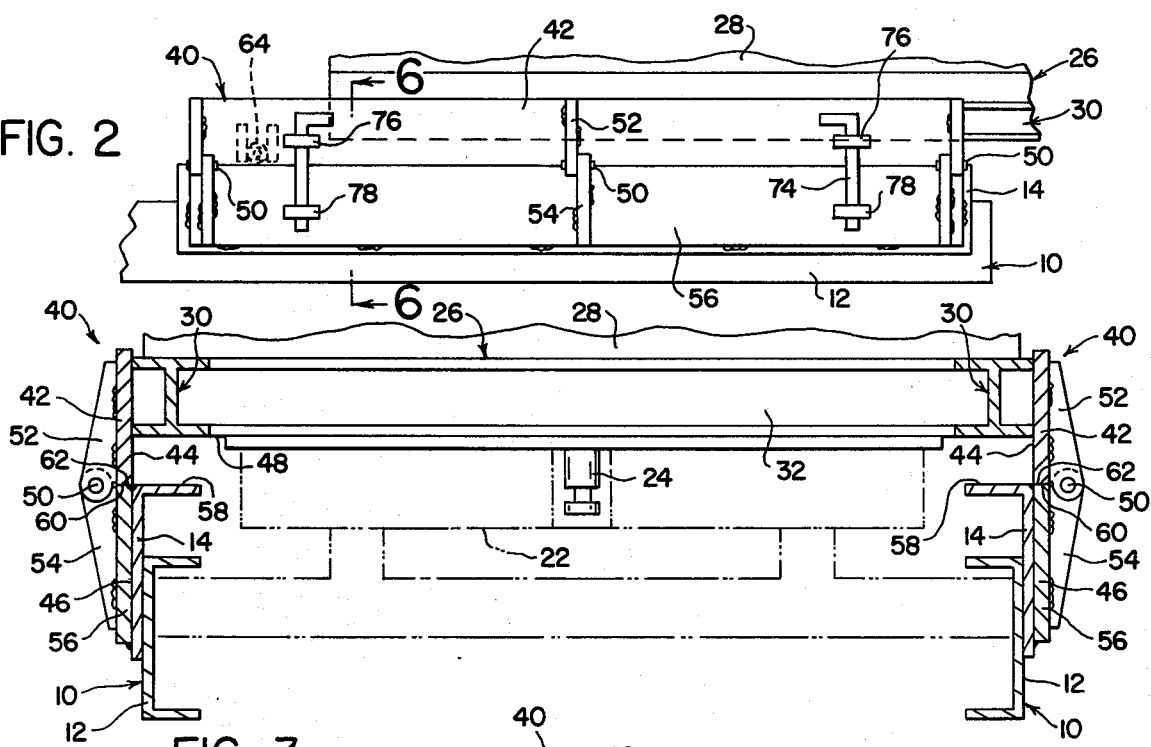
FIG. 2
FIG. 3
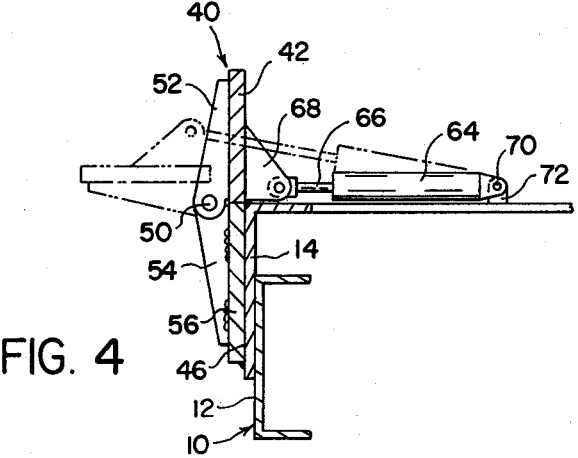
FIG. 4

TRACTOR TO TRAILER CONNECT SYSTEM

BACKGROUND OF THE INVENTION

This invention relates in general to four-wheeled draft vehicles or tow tractors such as are conventionally employed to haul vehicular trailers in highway travel, and more particularly, to a tractor having an interchangable connection arrangement for the tractor and trailer selectively providing either an articulated or a rigid unitary draft connection therebetween.

For certain applications such as, for example, the hauling of airport refueling tankers, it is desirable to employ a tractor-trailer rig arrangement in which the two units are rigidly interconnected or locked together so as to operate as a straight truck. The tractors commonly in use at present for hauling trailers are normally equipped with a so-called fifth-wheel coupling member to which a kingpin on the forward end of the trailer underframe is attached to provide an articulated draft connection between the tractor and trailer. Such fifth-wheel connection type tractors thus afford no way of using them in a straight truck application wherein the tractor chassis frame is locked in place to the trailer underframe to provide a rigid unitary interconnection therebetween. Likewise, and so far as known, there are no straight truck type tractor-trailer arrangements presently in use or known that provide any way for disconnecting or exchanging the tractor unit.

SUMMARY OF THE INVENTION

It is an object of the invention to provide a tractor-to-trailer connect system which permits selective attachment of the trailer to the tractor either by an articulated draft connection or by a rigid unitary draft connection.

Another object of the invention is to provide a tow tractor which can be selectively attached to a vehicular trailer either by an articulated draft connection or by a rigid unitary draft connection.

Still another object of the invention is to provide a tow tractor having trailer attachment means on its chassis frame enabling selective attachment of the trailer to the tractor either by an articulated draft connection or by a rigid unitary draft connection.

A further object of the invention is to provide a four-wheeled tow tractor which can be selectively attached to a vehicular trailer by either an articulated or a rigid unitary draft connection and which is further provided with steering mechanism selectively controllable to provide either two-wheel front end steering only of the tractor or four-wheel steering of all four wheels thereof in unison.

Briefly stated, in accordance with one aspect of the invention, a tow tractor or draft vehicle of the type having a conventional fifth-wheel coupling unit on the rear of its chassis frame for articulated draft connection to the customary kingpin provided on the underframe of conventional type vehicular trailers, is provided with movable guides on its chassis frame. The guides are selectively positionable either in a lowered inoperative position for conventional fifth-wheel articulated operation of the tractor and trailer, or in a raised upright position projecting above the tractor chassis frame beam members. In the latter position, the guides provide a snug sliding interfit and interlock with the trailer underframe to thereby provide a rigid unitary connection therebetween.

According to a further aspect of the invention, a four-wheeled tow tractor is provided with the aforementioned trailer attachment means and has all of its four wheels steerably mounted on the tractor chassis. The tractor is provided with a steering mechanism comprising separate steering linkages for the front and rear pairs of wheels, and an actuating arrangement for the steering linkages including a selectively operable system. The control system is operable in one mode to lock the two steering linkages together to thereby afford four-wheel steering of both the front and rear pairs of wheels in unison. The control system is operable in a second mode to unlock the two steering linkages from one another so as to permit steering of the front pair of wheels independently of the rear pair of wheels. In the second mode of operation the rear pair of wheels are locked in straight ahead running positions to thereby afford conventional two-wheel front end steering of the tractor.

Further objects and advantages of the invention will appear from the following detailed description of a species thereof and from the accompanying drawings.

BRIEF DESCRIPTION OF THE DRAWING

In the drawings:

FIG. 1 is a schematic side elevation of a tow tractor and vehicular trailer rig the tractor unit of which is provided with the novel trailer attachment means comprising the invention.

FIG. 2 is a longitudinal side elevation of the guide rail trailer interlock means on the tractor comprising the invention.

FIG. 3 is a transverse vertical section taken on the line 3—3 of FIG. 1 and showing the auxiliary guide rails on the tractor chassis in their raised operative position and slidably interfitted with the trailer underframe to lock them together as a rigid unitary assembly.

FIG. 4 is a transverse vertical section taken on the line 4—4 of FIG. 1 and showing the mechanism for raising the auxiliary guide rails on the tractor to their upright operative position and folding them down to their lowered inoperative position.

DESCRIPTION OF THE PREFERRED EMBODIMENT

Figure 5:
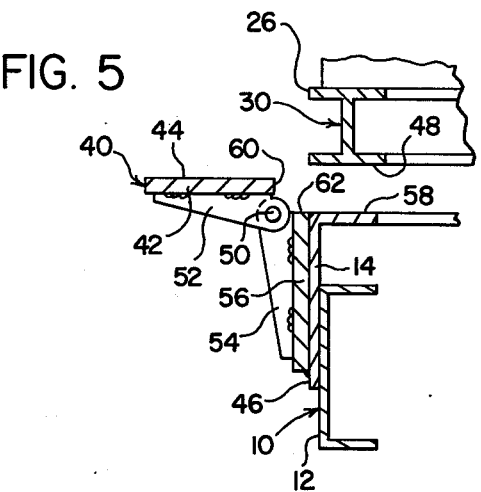
FIG. 5 is a view similar to FIG. 3 but showing the auxiliary guide rails for the trailer swung down to their lowered inoperative position.

Referring to FIG. 1, the invention is there shown as applied to a conventional type self-propelled four-wheeled tow tractor or draft vehicle A such as is commonly employed at present to haul vehicular trailers. The particular trailer B is illustrated, by way of example, as being a so-called airport refueler or tanker. The tractor A is comprised of a chassis frame 10 formed of a pair of horizontally spaced parallel side channel beam members 12 extending longitudinally of the tractor and suitably braced by cross frame members (not shown). The side channel beam members 12 may be reinforced by additional beam members 14 extending alongside and secured to the frame members 12. The chassis frame 10 is supported adjacent its front end portion in a usual manner by a pair of dirigible mounted or steerable front wheels 16 and at its rear load-carrying portion by a similar pair of dirigible-mounted steerable rear support and drive wheels 18. A common type truck engine or motive power plant unit (not shown) mounted on the front end portion of the chassis frame 10 drives the rear wheels 18 through a conventional drive shaft 20 (FIG. 7) which drives the rear wheels 18 through the usual differential drive connection and rear axle arrangement (not shown). The chassis frame 10 extends rearwardly beyond an operator's cab C mounted on the forward end portion of the chassis frame. The chassis frame carries, on a rearward portion, a conventional type fifth-wheel coupling unit 22 for engaging and locking with a kingpin 24 (FIG. 3) depending from the forward end of the underframe 26 of the trailer B to provide an articulated draft connection between the tractor A and trailer B.

The particular airport refuel type trailer B illustrated comprises an elongated fuel-carrying tank 28 extending horizontally and mounted on the underframe 26. As here shown, the underframe 26 has an elevated forward end portion formed of a pair of longitudinally extending horizontally spaced parallel I-beams 30 suitably braced by cross frame members 32 (FIG. 3) and rigidly joined to a rearward drop-bed frame portion formed of a pair of longitudinally extending horizontally spaced parallel beam members 34 of sturdy form and suitably braced by cross frame members (not shown). For supporting the forward end of the trailer B in place when not connected to a tractor A, a conventional type of retractable wheeled support means 36 such as commonly employed for this purpose may be provided on the underframe of the trailer B adjacent its forward end.

Figure 6:
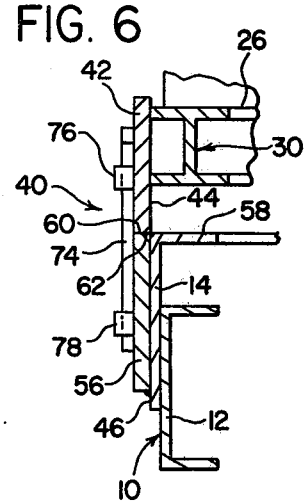
FIG. 6 is a vertical section taken on the line 6—6 of FIG. 2 and showing the safety locking stakes in place for locking the guide rails in their raised operative position.

In accordance with the invention, the tractor A is provided with auxiliary trailer attachment or guide means 40 on the rear end portion of the chassis frame 10 within and between which guide means the longitudinally extending side beam members 30 of the trailer underframe 26 have a snug sliding interfit as shown in FIGS. 3 and 6 to, in effect, lock the tractor chassis frame 10 and trailer underframe 26 together as a single rigid unit. The auxiliary trailer attachment means 40 thus permits the tractor or draft vehicle A to be rigidly interconnected as a unitary assembly with trailer B for operation as a straight truck such as is desirable in certain applications. The particular form of trailer guide means 40 illustrated comprises a cooperating pair of elongated guide plates or guide rail members 42 extending longitudinally alongside the outboard sides of the respective side reinforcing beam members 14 of the tractor chassis frame 10 abreast of the fifth wheel 22 thereon. The guide rails or plates 42 are movably mounted on the chassis frame for positioning either in a raised upright operative position as shown in FIGS. 3 and 6 or in a lowered inoperative position which may be as shown in FIG. 5. In their raised operative position, the guide rails or plate members 42 project above the reinforcing beam members 14 of the chassis frame 10 with their opposed inward or facing sides 44 disposed vertically in substantial vertical and longitudinal alignment with the outward vertical sides 46 of the chassis beam members 14. The raised guide rails 42 form the ways of a guideway within which the two parallel side beams 30 of the trailer underframe 26 have a snug sliding interfit to firmly lock the tractor chassis frame 10 and trailer underframe 26 together in the horizontal plane thereof as a single rigid unitary frame assembly. In their lowered inoperative position as shown for example in FIG. 5, the guide rails or movable plate members 42 are located in a position in which thy lie entirely below and thus clear of the underside 48 of the trailer beams 30 and underframe 26 so as not to obstruct or interfere with the swiveling of the coupled tractor A and trailer B about their fifth wheel 22 and kingpin 24 articulated connection.

In the preferred form of the invention illustrated, the two side guide rails or plate members 42 are pivotally mounted on the chassis frame 10, on respective axially aligned pivot pins or pintles 50 (three such pivot pins 50 being shown for each guide plate 42) which pins 50 are carried by and extend horizontally and longitudinally of the chassis reinforcing beam members 14. The pivotal mounting of the guide rails 42 on the pivot pins 50 permits swinging movement of the guide rails in a transverse vertical plane between their raised upright operative position (FIG. 3) and a lowered inoperative position in which they are folded down to a substantially horizontal position, as shown in FIG. 5, and lie entirely below the undersides 48 of the trailer underframe side beams 30. The side guide rails or plate members 42 are pivotally mounted on the pivot pins 50 at their opposite ends and at intermediate points along their length by means of integral ears or lugs 52 which are formed on the outward sides of the plate members 42 and within which the pivot pins 50 are journaled. The pivot pins or pintles 50 may be supported in place from the chassis frame 10 in corresponding lugs or ears 54 which may be formed integral with respective elongated side anchor plate members 56 welded or otherwise fixedly secured to the outer sides of the respective side reinforcing beam members 14 of the chassis frame.

The side anchor plates 56 are mounted on the chassis frame beam members 14 so as to position the respective pivot pins 50 on each plate 56 horizontally with their axes coaligned and lying approximately in the horizontal plane of the upper surfaces 58 of the reinforcing beam members 14. The side anchor plates 56, along with the guide plates or rail members 42 pivotally connected thereto, thus together constitute, in effect, respective hinged plate structures comprising the auxiliary trailer connection means of the invention. The heel edges 60 and 62 (FIG. 5) of the pivoted guide plates 42 and the fixed side anchor plates 56, respectively, are so located as to abut against one another along horizontal planes passing through the axes of the respective pivot pins 50 when the pivoted guide plates are swung upwardly to their upright operative position. The heel edges 60 and 62 thus serve as limiting stops for fixing the position of the pivoted side guide rails or plates 42 in their vertically upright operative position. For the purposes of the invention, the pivoted guide plates or rail members 42 should extend a sufficient length, for example around 4 to 6 or more feet, along the length of the chassis frame beam members 12 in order to afford an adequate purchase or lock between the guide rail members 42 and the trailer underframe beam members 30, in the horizontal plane thereof, sufficient to withstand all the normal horizontal couple forces to which they may be subjected in service and which result from the tendency of the trailer B to pivot about its articulated connection to the tractor A at 24. Also, the guide plates or rail members 42 preferably are formed of sufficient width to overlap, when in their raised upright or erected operative position (FIG. 3), substantially the full vertical extent of the trailer underframe beam members 30.

The pivoting of the side guide rails or plates 42 between their raised and lowered positions may be effected by means of a pair of two-way acting hydraulic cylinders 64 (FIG. 4). The piston rods 66 extending from one end of the cylinders are connected at their outer ends to inward ears 68 on the guide rails 42. The other ends of the cylinders 64 are pivotally mounted on the chassis frame 10 as by means of pivot pins 70 supported on pillow blocks 72 secured to the frame. The cylinders 64 are pivoted on the pillow blocks 72 to swing in vertical planes transverse to the longitudinally extending side beams 12 of the tractor chassis 10. The hydraulic cylinders 64 are connected to a source of fluid under pressure (not shown) which is carried by the tractor A, the fluid flow of which is controlled by suitable valve control means (not shown). The hinged guide plates or rails 42 may be positively locked in their raised upright operative position to maintain the rigid interlock of the tractor chassis frame 10 to the trailer underframe 26 against accidental disablement or loss. This interlock is accomplished with safety locking pins or stakes 74 (FIGS. 2 and 6) which are inserted through and snugly fit within apertures or passageways which are provided by cooperating pairs of saddle blocks or ears 76 and 78 fixed on the outward sides of the guide rails 42 and anchor plates 56. As best shown in FIG. 6, the saddle blocks 76,78 are vertically aligned with one another, when the guide rails 42 are in their raised upright operative position, to permit interlocking insertion of locking pins 74.

In the use of the tractor A, according to the invention, to haul a trailer B by a conventional fifth-wheel and kingpin articulated type connection only, the hydraulic cylinders 64 for the pivoted side guide rails 42 are actuated to swing or fold the rails down to their lowered inoperative position, as shown in FIG. 5. The tractor A is then backed under the forward end of the trailer B to position and lock the kingpin 24 in its articulated draft connection position in the fifth-wheel 22 of the tractor. When it is desired to attach the tractor A to a trailer B by a rigid unitary connection, with their frame 10 and underframe 26 locked together as a single unit, the hydraulic cylinders 64 for the pivoted side guide rails 42 are actuated to swing the guide rails up to their raised upright operative positions as shown in FIG. 3. The safety locking pins 74 are inserted through the apertured ears 76 and 78 on the guide rails 42 and anchor plates 56 to positively lock the guide rails in place in their erected positions. The tractor A is then backed under the forward end of the trailer underframe 26 to slide the trailer side beams 30 into the guideway formed by the facing vertical sides or ways 44 of the erected guide rails 42 on the tractor chassis frame 10. The tractor chassis frame 10 and trailer underframe 26 are then interconnected as a single unitary frame assembly. At the same time, the kingpin 24 on the trailer B slides into and is locked in the fifth-wheel 22 of the tractor A. Interlocking of kingpin 24 and fifth-wheel 22 provides the draft connection between the tractor and trailer and completes the straight truck interconnection.

Figure 7:
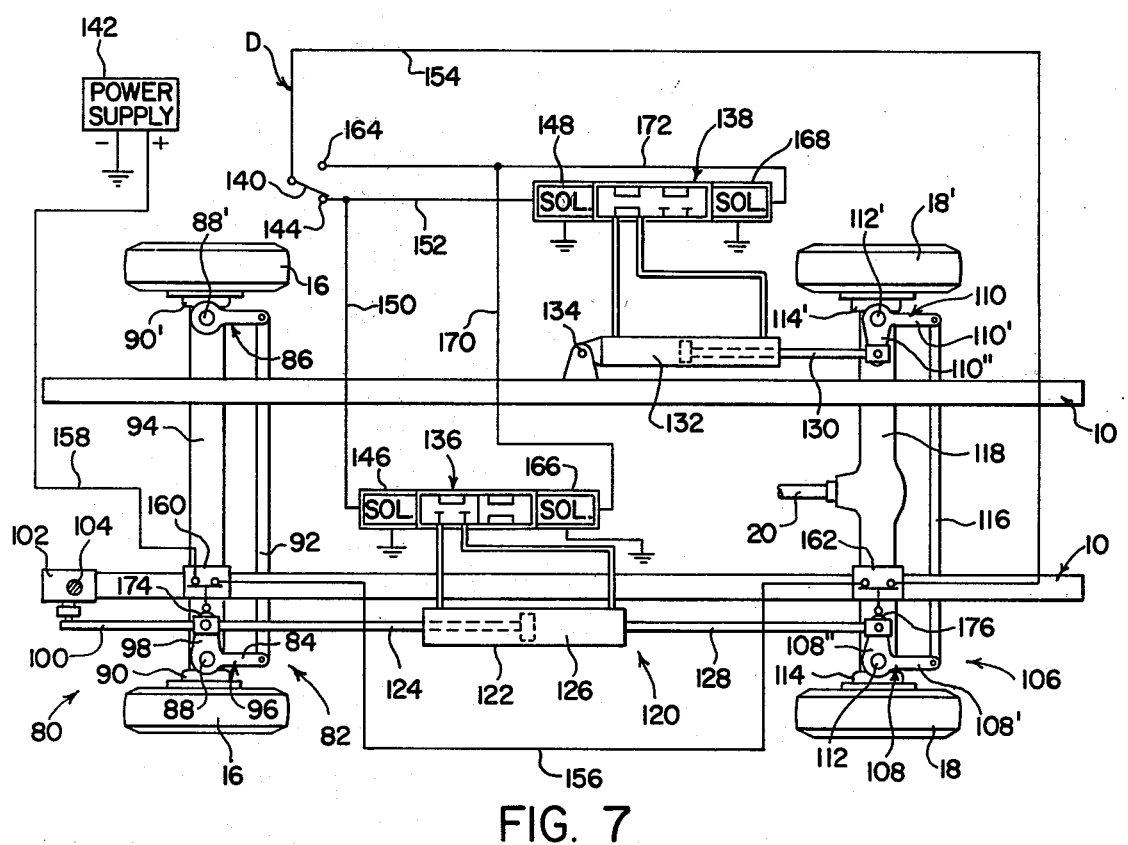
FIG. 7 is a schematic plan view of the tow tractor comprising the invention showing the steering arrangement thereof and the control means therefor.

When the tractor A is rigidly connected to the trailer B it is advantageous to employ a four-wheel or crab type steering system in which all four wheels steer in unison in the same direction. To this end, the tractor A is further provided with steering mechanism 80 (FIG. 7). This mechanism permits selective operation of the tractor either with conventional front wheel steering or, in the alternative, with four-wheel crab type steering.

Referring to FIG. 7, the coupled pair of dirigibly mounted front wheels 16 are provided with a steering linkage system generally indicated at 82. Specifically, the system includes a bell crank 96 fastened to kingpin 88 of the steering knuckle 90 of one of the front wheels. Bell crank 90 includes drag links 84 and 98, with drag link 84 extending rearwardly for pivotal connection to one end of a horizontal cross tie rod 92. Drag link 98 extends transversely for pivotal connection at its inner end to one end of steering linkage actuating rod 100. Rod 100 extends forwardly of the tractor A and is connected at its forward end in the usual manner to the steering gear 102 on the lower end of steering column 104 of the tractor. The opposite end of tie rod 92 is pivotably secured to drag link 86 mounted on kingpin 88' of knuckle 90'. Rotation of the steering column 104 acts, through the steering mechanism 102, to shift the steering rod 100 lengthwise of the tractor. When rod 100 shifts, drag links 84 and 86 turn the dirigibly mounted front wheels 16 in unison.

The coupled pair of dirigibly mounted rear wheels 18 are provided with a steering linkage 106 similar to the steering linkage 82 for the front wheels. The rear wheel steering system includes bell cranks 108 and 110 connected at their elbows to the kingpins 112 and 112', respectively, of the steering knuckles 114 and 114'. Rearwardly extending drag links 108' and 110' are pivotably interconnected at their ends by a cross tie rod 116 extending more or less parallel to the rear axle housing 118. Pivoting of one or the other of the bell cranks 108, 110 acts, through the connecting tie rod 116, to pivot the other one of these bell cranks to steer the rear wheels 18 in unison. Drag link 108" is pivotably connected at its inner end to one end of connecting link means 120. Connecting link means 120 connects the two steering systems 82 and 106 by means of a double acting hydraulic cylinder 122. The piston rod 124 of the cylinder 122 forms the front section of the connecting link means 120 while the cylinder housing 126 and connecting rod 128 forms the rear section. The piston rod 124 is pivotably connected at its forward end to the end of drag link 98 of bell crank 96 on front wheel 16 while the connecting rod 128 is pivotably connected at its rearward end to the end of drag link 108". The lever arm 110" of bell crank 110 on rear wheel 18 is pivotably connected to the piston rod 130 extending from one end of a double acting hydraulic cylinder 132. Cylinder 132 is pivotably mounted at its other end, at 134, on the chassis frame 10 of the tractor A for pivotal movement in the plane of the frame 10.

The operation of hydraulic cylinders 122 and 132 are controlled by respective two-position solenoid controlled valves 136 and 138. In one position of each valve it is closed or blocked between its valve ports to prevent the flow of oil or other hydraulic fluid therethrough while in its other position it is open between the valve ports to permit the flow of the hydraulic fluid therethrough. The two valves 136 and 138 are arranged so that when one or the other of the two hydraulic cylinders 122 and 132 is open and thus able to float, the other cylinder is blocked so that its cylinder housing and piston rod are locked in place against relative linear movement. In the case of the cylinder 122, when it is placed in its blocked position its cylinder housing 126 then becomes locked with its piston rod 124 so as to form an integral linearly locked part of a fixed length connecting link means 120. Each of the cylinders 122 and 132 together with their respective hydraulic in-flow and out-flow conduits leading to and from their respective control valves 136 and 138 form a closed hydraulic system. This closed system is charged with a fixed quantity of hydraulic fluid such as oil.

The operation of the valves 136 and 138 is controlled by an electrical control circuit D comprising a single pole double throw master control switch 140. In each of its respective closed positions, switch 140 is arranged to connect one or the other position-controlling solenoids of each of the valves 136 and 138 to a suitable supply 142 of electrical power, such as an electric storage battery. When the master switch 140 is in its one closed position in engagement with its switch contact 144, the solenoid 146 actuates and positions the valve 136 in its closed or blocked position. Simultaneously, the solenoid 148 actuates and positions the valve 138 in its open or floating position. Solenoids 146 and 148 are connected by conductors 150 and 152 to the power supply 142 through conductors 154, 156 and 158 and a pair of cam-operated single pole single throw normally open switches 160 and 162 which are mounted on the chassis 10 adjacent the front and rear axle housings 94 and 118, respectively. Switches 160 and 162 are arranged to be closed so as to become connected in series across the master switch 140 and power supply 142 by the conductors 154, 156 and 158 only when both the front pair of wheels 16 and the rear pair of wheels 18 are in the straight ahead or forward running position, as shown. Alternatively, when the master switch 140 is in its other closed position in engagement with its other switch contact 164, the solenoid 166 actuates and positions the valve 136 in its open or floating position, and the solenoid 168 actuates and positions the valve 138 in its closed or blocked position. Solenoids 166 and 168 are connected by conductors 170 and 172 to the power supply 142 through the conductors 154, 156 and 158 and through the cam-operated switches 160 and 162. The closure of switches 160,162 when the wheels 16 and 18 are in their straight ahead position is effected by their engagement with cams 174 and 176 on the drag links 98 and 108", respectively, of the front and rear wheel steering linkages 82 and 106. When valves 136 and 138 have been actuated and positioned in one or the other of their two operating positions, they will then remain in these positions until they have been actuated and positioned in their other or reverse positions by the energization of the control circuit D.

When it is desired to operate the tractor A with four-wheel crab type steering, the master switch 140 is closed to connect the conductors 150 and 152 and the valve actuating solenoids 146 and 148 into the circuit D. The front and rear wheels 16 and 18 are positioned in a straight ahead running position to close the cam-operated switches 160 and 162 which close circuit D. Solenoids 146 and 148 are energized and the valves 136 and 138 are respectively positioned in their blocked and open positions, as shown in FIG. 7. The cylinder 122 is thus blocked so that its housing 126 is then locked in place with its piston rod 124. With housing 126 and piston rod 124 interlocked, connecting link means 120 rigidly interconnects the front and rear steering linkages 82 and 106 so that they steer in unison. At the same time, the other hydraulic cylinder 132 is in its floating position so that its piston rod 130 can freely move linearly within the cylinder and thus permit free steering movement of the rear wheel steering linkage 106 along with the front wheel steering linkage 82.

To operate the tractor A with conventional front wheel steering, the master switch 140 is closed to connect the switch contact 164, conductors 170 and 172 and the valve actuating solenoids 166 and 168 into the circuit D. The front and rear wheels 16 and 18 are positioned in a straight ahead running position so that the cam-operated switches 160 and 162 will be closed by the cams 174 and 176 to close the circuit D. Solenoids 166 and 168 are energized and the valves 136 and 138 are positioned in their open and blocked positions, respectively. The piston rod 124 is thus able to float so that steering movement of the front wheel steering linkage 82 will not be transmitted through the then floating connecting link means 120 to the rear wheel steering linkage 106. At the same time, the blocked cylinder 132 locks its piston rod 130 in place, thereby locking the rear wheel steering linkage 106 in place against any steering movement and so locking the rear wheels 18 in their straight ahead running position.

While considerable emphasis has been placed on the preferred embodiments of the invention herein illustrated and described, it will be appreciated that many embodiments of the invention can be made and that many changes can be made in the preferred embodiments without departing from the principles of the present invention. Accordingly, it is to be distinctly understood that the foregoing descriptive matter is to be interpreted merely as illustrative of the present invention and not as a limitation.

Having thus described our invention, we now claim:

1. A wheel supported draft vehicle comprising a chassis frame including a motive power carrying front portion and a load carrying rear portion, said chassis frame having front and rear pairs of wheels mounted thereon, and selectively operable connecting means on the said rear portion of said chassis frame for making articulated and non-articulated draft connections with a vehicular trailer, said selectively operable connecting means including coupling means on said rear portion of said chassis frame interengagable with kingpin means on a vehicular trailer to provide an articulated connection between said trailer and draft vehicle, and said selectively operable connecting means further including plate means mounted on said rear portion of said chassis frame for movement between a first position engaging laterally opposite sides of said trailer and a second position out of engagement with said trailer, said plate means in said first position interengaging said draft vehicle and trailer against relative pivotal movement.

2. A wheel supported draft vehicle as specified in claim 1, wherein said front and rear pairs of wheels are steerable, steering mechanism means connected to said wheels, and control means for said steering mechanism means having first and second control modes, said steering mechanism means being operable in said first mode of said control means to couple said front and rear pairs of wheels for steering in unison, and said steering mechanism means being operable in said second mode of said control means to lock said rear pair of wheels against steering and to enable steering of said front pair of wheels ralative thereto.

3. A wheel supported draft vehicle as specified in claim 2, wherein said steering mechanism means comprises hydraulic piston and cylinder means, and said control means includes valve means controlling actuation of said hydraulic piston and cylinder means.

4. A wheel supported draft vehicle comprising a chassis frame including a motive power carrying front portion and a load carrying rear portion, said chassis frame having front and rear pairs of wheels mounted thereon, and selectively operable connecting means on the said rear portion of said chassis frame for making articulated and non-articulated draft connections with a vehicular trailer, said trailer including kingpin means and said selectively operable connecting means including coupling means on said rear portion of said chassis frame interengagable with said kingpin means to provide an articulated draft connection between said trailer and draft vehicle, said selectively operable connecting means further including plate means to interengage said draft vehicle and trailer against relative pivotal movement between said kingpin means and said coupling means, said plate means being mounted on said rear portion of said chassis frame for movement between a first position interengaging with said trailer and a second position out of engagement with said trailer, and said plate means including plate members laterally spaced apart on said rear portion of said chassis frame and mounted thereon for pivotal movement about corresponding longitudinal axes between said first and second positions.

5. A wheel supported draft vehicle as specified in claim 4, and motor means to pivot said plate members between said first and second positions.

6. A wheel supported draft vehicle comprising a chassis frame including a motive power carrying front portion and a load carrying rear portion, said chassis frame having front and rear pairs of wheels mounted thereon, and selectively operable connecting means on the said rear portion of said chassis frame for making articulated and non-articulated draft connections with a vehicular trailer, said connecting means including a fifth wheel coupling member on said rear portion of said chassis frame for articulated connection with said trailer, said chassis frame comprising a pair of laterally spaced longitudinally extending parallel beam members, and said connecting means further including guide members movably mounted on said beam members for selectively positioning in an inoperative position and an operative position, said guide members in said inoperative position permitting unobstructed articulated movement between said draft vehicle and trailer, and said guide members in said operative position providing opposed parallel guide ways adapted to engage laterally opposite sides of said trailer and restrain articulated movement between said draft vehicle and trailer.

7. A wheel supported draft vehicle as set forth in claim 6, and hydraulic means mounted on said chassis frame and connected to said movable guide members for selectively positioning said guide members in said inoperative and operative positions.

8. A wheel supported draft vehicle as specified in claim 6, and locking means engageable with said chassis frame beam members and said movable guide members to lock said guide members in said operative position.

9. A wheel supported draft vehicle as specified in claim 6, wherein the said guide members are pivotally mounted on said chassis frame beam members for pivotal movement about longitudinally extending axes between said inoperative and operative positions.

10. A wheel supported draft vehicle as specified in claim 9 wherein said chassis frame beam members have vertical outer side surfaces, said guide members in said operation position having opposed inner surfaces disposed in the vertical plane of the outer side surface of the corresponding chassis frame beam member.

11. A wheel supported draft vehicle as specified in claim 10, and hydraulic motor means mounted on said chassis frame and connected to the said guide members for pivoting said guide members between said inoperative and operative positions.

12. A wheel supported draft vehicle as specified in claim 11, and locking means engageable with said chassis frame beam members and said pivotal guide members to lock the said members in said operative position.

13. A wheel supported draft vehicle as specified in claim 9, wherein said front and rear pairs of wheels are steerable, steering mechanism means connected to said wheels, and control means for said steering mechanism means having first and second control modes, said steering mechanism means being operable in said first mode of said control means to couple said front and rear pairs of wheels for steering in unison, and said steering mechanism means being operable in said second mode of said control means to lock said rear pair of wheels against steering and to enable steering of said front pair of wheels relative thereto.

14. A wheel supported draft vehicle as specified in claim 13, wherein said steering mechanism means includes front and rear steering linkage means respectively connecting said front pair of wheels for turning movement together and said rear pair of wheels for turning movement together, connecting link means between said front and rear steering linkage means comprising first hydraulic cylinder and piston means including first cylinder means connected to one of said steering linkage means and first piston means in said first cylinder means and connected to the other of said steering linkage means, said first hydraulic cylinder and piston means having first and second operating modes in which said first piston means is respectively movable and immovable relative to said first cylinder means, whereby said connecting link means in said second operating mode of said first hydraulic cylinder and piston means provides simultaneous operation of said front and rear linkage means in unison, second hydraulic cylinder and piston means including second hydraulic cylinder means connected to one of said chassis frame and rear steering linkage means and second piston means in said second cylinder means and connected to the other of said chassis frame and rear steering linkage means, said second hydraulic cylinder and piston means having first and second operating modes in which said second piston means is respectively immovable and movable relative to said second cylinder means, whereby said second hydraulic cylinder and piston means in said first operating mode locks said rear pair of wheels against turning movement, said control means including hydraulic circuit means for said first and second hydraulic cylinder and piston means, and means in said hydraulic circuit means selectively operable to alternately place said first and second hydraulic cylinder and piston means in said first and second operating modes thereof to respectively achieve front wheel steering and front and rear wheel steering.

15. A wheel supported draft vehicle as specified in claim 14, wherein said means in said hydraulic circuit means includes first and second electrically controlled valves connecting said hydraulic circuit respectively with said first and second hydraulic cylinders, said control means further including electric circuit means for controlling said first and second valves.

16. A wheel supported draft vehicle as specified in claim 15, wherein said electric circuit means includes switch means selectively operable to actuate said first and second valves to place said first and second hydraulic cylinder and piston means in said first and second operating modes thereof.

17. A wheel supported draft vehicle as specified in claim 6, wherein said front and rear pairs of wheels are steerable, steering mechanism means connected to said wheels, and control means for said steering mechanism means having first and second control modes, said steering mechanism means being operable in said first mode of said control means to couple said front and rear pairs of wheels for steering in unison, and said steering mechanism means being operable in said second mode of said control means to lock said rear pair of wheels against steering and to enable steering of said front pair of wheels relative thereto.

* * * * *